United States Patent Office 3,347,997
Patented Oct. 17, 1967

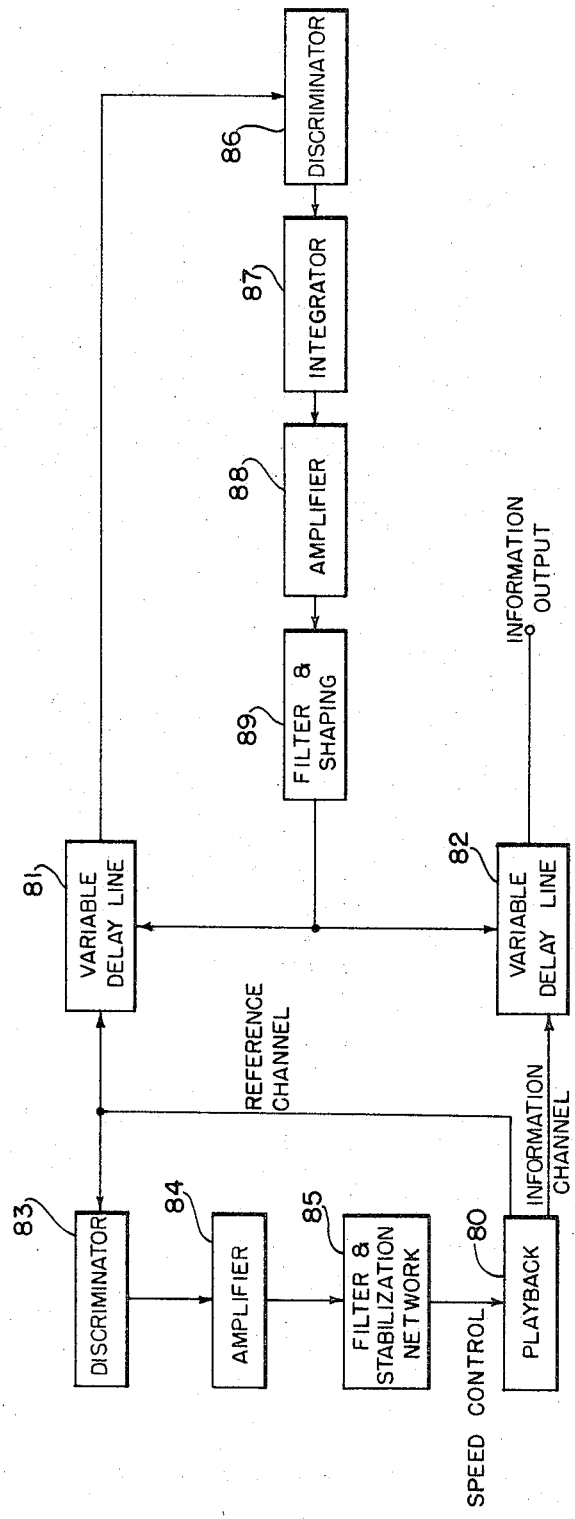

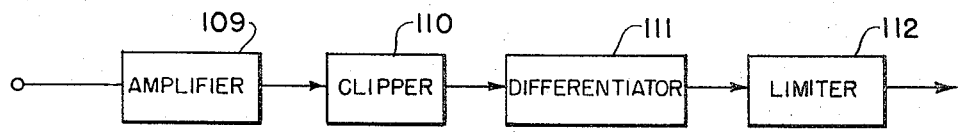
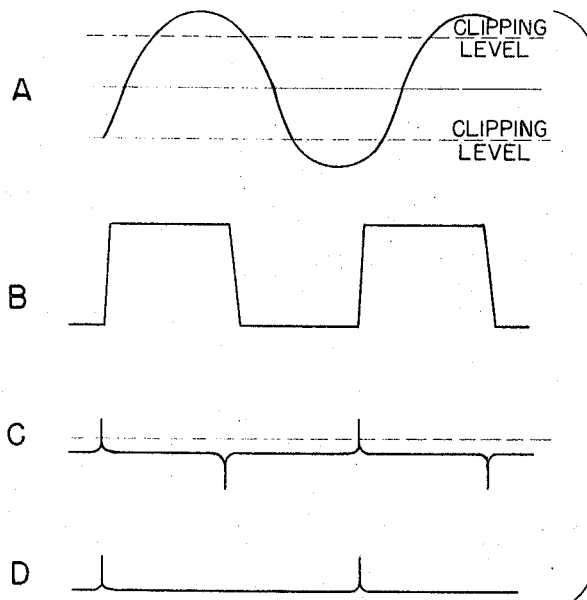
FIG. 12
FIG. 13
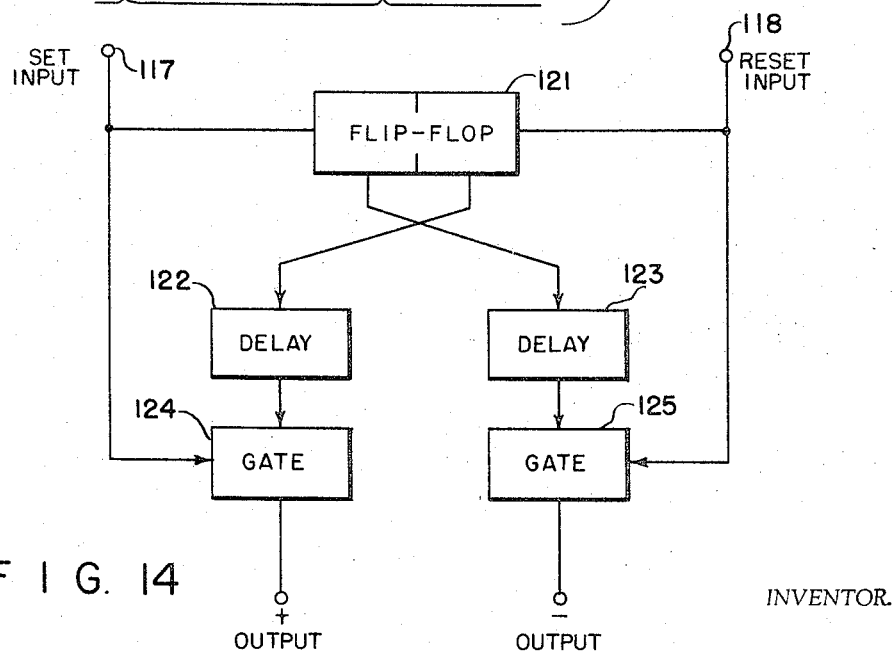
FIG. 14

3,347,997
PLAYBACK SYSTEM UTILIZING VARIABLE DELAY AND SPEED CONTROL MEANS FOR FLUTTER AND WOW COMPENSATION
Thomas E. Woodruff, Nashua, N.H., assignor to Sanders Associates, Inc., Nashua, N.H., a corporation of Delaware
Filed Aug. 7, 1963, Ser. No. 300,558
12 Claims. (Cl. 179—100.2)

ABSTRACT OF THE DISCLOSURE

This invention relates in general to the recording and playback of information by electronic apparatus and more particularly pertains to an arrangement of apparatus for removing flutter and wow from the output of a playback system. The playback system comprises a playback device possessing both a reference channel and an information channel. Imperfections such as flutter and wow affect signals on both channels in the same manner. The reference channel signal is applied to a phase detector which measures the error between this signal and a standard source such as reference oscillator. The output of the phase detector is filtered, resulting in separation of the high-frequency and low-frequency components. The information channel is applied to a variable delay system at the output of which the signal is obtained. High-frequency variations, called "flutter," are applied to the variable delay line system resulting in compensation of the information channel for any errors of the playback device. The low-frequency output of the phase detector is applied to control the speed of the playback device thereby eliminating any low-frequency variations called "wow."

---

In recording and playback systems where the information is recorded as signals on a medium moved relative to a "writing" device, for the finally reproduced signal to be an accurate representation of the recorded signal, the motion of the recording medium relative to the "reading" device must be identical to the motion obtaining during recording. To obtain fidelity of reproduction, the relative motion between the medium and the "writing" and "reading" devices is made as uniform as manufacturing techniques, having due regard to economic factors, allow. One of the problems in recording is obtaining uniform motion, and the non-uniformity of that motion gives rise to flutter and wow which impair fidelity of reproduction.

Flutter and wow are basically similar phenomena which distort the reproduced signals. Flutter and wow differ in frequency; both are periodic and momentary speed variations from the average relative motion. Flutter and wow cause observable and undesirable frequency variations in the reproduced signals which were not present in the originals. Where the cyclic rate of speed variation is 5 c.p.s. or less, it is generally termed "wow"; while higher cyclic rate of speed variations are termed "flutter." The flutter rate is the number of cycles in each second that the speed oscillates and the recorded signal frequency flutters, one cycle of flutter being a swing from maximum deviational speed to minimum deviational speed and back to maximum deviational speed. Percent of flutter is the ratio of the root-mean-square deviation in relative speed of the frequency of the reproduced signal from the speed or the frequency of the original signal.

In recording systems of the type where electrical signals applied to a "head" are recorded on a medium, such as magnetic tape, moved relative to the head, the mechanical transport mechanism causing the relative motion is a primary source of wow and flutter because of the inability of the transport mechanism to maintain uniform and unvarying relative motion. In addition, where the recording medium is magnetic tape, flutter and wow are caused by stretching and vibration of the tape as it moves past the recording head, and, on playback, by stretching the vibration of the tape as it is moved past the reading head.

By careful design and close control of manufacturing processes, flutter and wow in magnetic tape and other recording apparatus has been held to tolerable levels. However, recorders having low flutter and wow components are expensive because of the precision required in their manufacture, and such recorders tend to be heavy and bulky. There are a number of uses for tape recorders and other signal recorders where compactness and lightness of weight are requisite and where fidelity of reproduction is essential. The invention makes feasible the use of tape recorders and other types of signal recorders permitting excellent fidelity of reproduction while not requiring heavy or massive recording apparatus. The invention also allows improvement of the fidelity of recording of existing signal recorders.

The invention, by way of example, can employ magnetic tape having a track on which a reference signal is recorded concurrently with recording of the information on the same or on one or more other tracks of the tape. For simplicity of exposition, the information is assumed to be recorded on only one track. When played back, both the recorded reference signal and the information are "read" simultaneously into different channels. Imperfections in the recorder and the playback mechanism affect both the reference signal and the information signal in the same manner and, therefore, the imperfections cause those "read" signals to be modulated by flutter. The reference signal is impressed upon a time error detector which determines the error in the reference signal caused by wow and flutter. The time error signal emitted by the detector is employed to control a delay mechanism in a manner such that the information passing through the delay mechanism emerges with the time error removed.

In one embodiment of the invention, the reference signal is passed through a variable delay line to a time error detector. In the detector the reference signal is compared with a signal having the same frequency as the original frequency of the reference signal. The detector emits an error signal which causes the delay line to adjust its delay time so that the compared signals have the same frequency. When this condition is attained, the reference signal is free from flutter. The information signal "read" from the playback mechanism is passed through a second delay line identical with the other delay line. Both delay lines have their delay times varied in the same manner and are concurrently controlled by the error signal from the detector. When the reference signal emerges from its delay line it is free of flutter, and the information signal issuing from its delay line is, consequently, also free of flutter.

The construction, systematic arrangement, and mode of operation of the invention can be better understood from the following exposition when considered in conjunction with the accompanying drawings in which:

FIG. 8 depicts an embodiment of the invention in which the speed control of the playback device is independent of the loop controlling the variable delay lines;

FIG. 12 is a block diagram of a cross-over pulse generator;

FIG. 13 depicts waveforms associated with the cross-over pulse generator;

FIG. 14 illustrates the scheme of a pulse differencer; and

Figure 1:
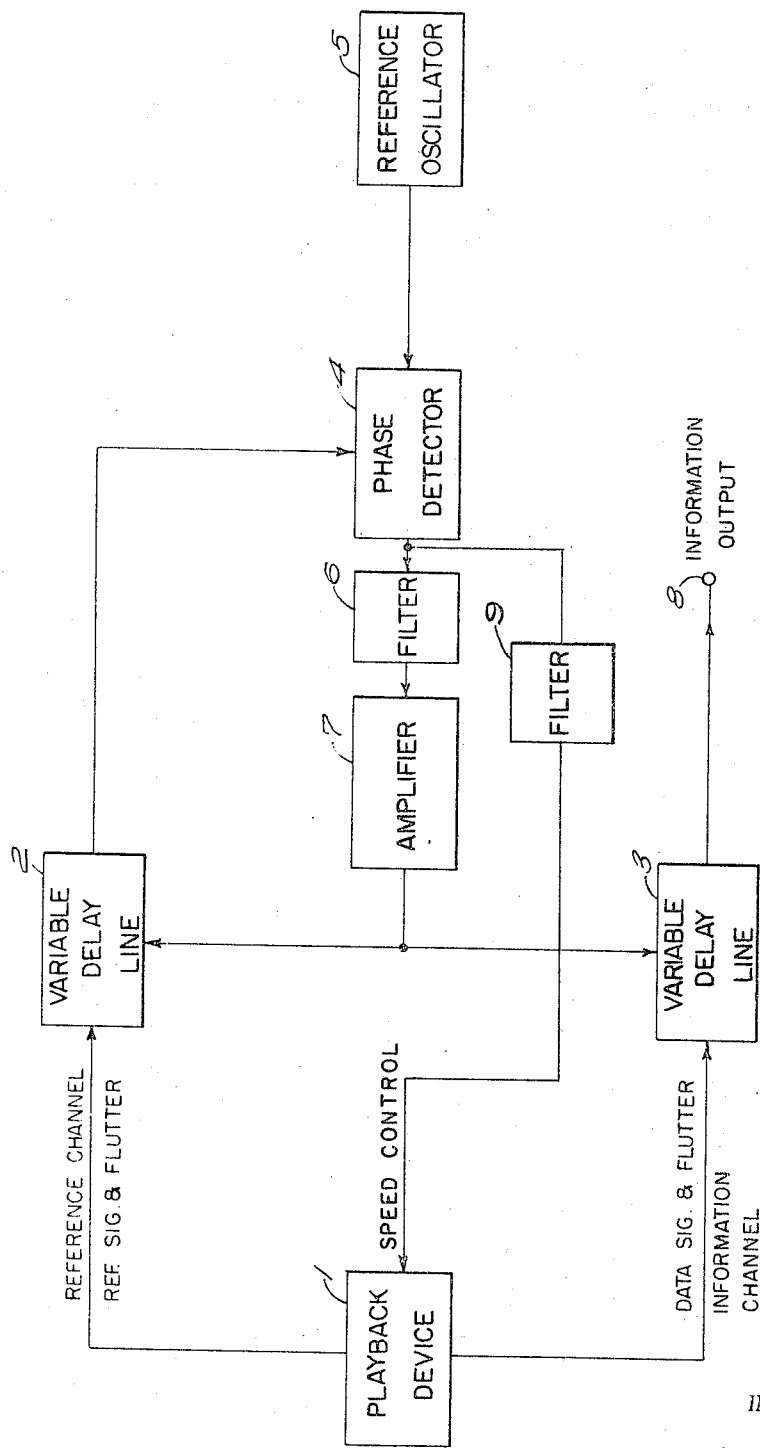
FIG. 1 depicts a simplified schematic arrangement of the invention.

Referring to FIG. 1, there is shown a simplified schematic arrangement of the invention. For purposes of exposition, it is assumed that playback device 1 employs a tape on which are recorded a reference signal, the original frequency of the reference signal having been constant, and data signals recorded concurrently with the reference signal. The playback mechanism is coupled to two channels, one channel being fed by the output obtained from the recorded reference signal and the other channel being fed by the output obtained from the recorded data signals. The two outputs are simultaneously obtained from the playback mechanism and hence those outputs contain the same wow and flutter components. Two variable delay lines 2, 3, are provided, the delay lines being arranged to provide the same delay. The output obtained from the recorded reference signal is applied to variable delay line 2, whereas the output obtained from the recorded data signals is applied to variable delay line 3. After transmission through delay line 2, the signals of the reference channel are applied to a phase detector 4 where those signals are compared with the phase of signals from a reference oscillator 5. The frequency of oscillator 5 is set to be the same as the original frequency of the reference signal which was recorded on the tape. The signal from oscillator 5 serves as an instantaneous time base datum for comparison with the signal emitted from the reference channel. When, therefore, the signal from the reference channel is corrected to correspond with the time base datum by altering the delay line in line 2, the signals in the information channel are likewise corrected by the matched variable delay line 3.

To remove the lower frequency components of flutter, the playback mechanism is provided with a speed control which governs the speed at which the tape is moved relative past the "read" head. The higher frequency components of flutter are eliminated by the delay lines which can be varied at a considerably faster rate than the speed of the playback mechanism. The combination of the rapidly variable delay line and the speed control of the playback device removes flutter throughout the frequency regions in which that disturbance occurs.

After passing through variable delay line 2, the reference signal is applied to a phase detector 4 where a comparison is made with the time base datum signal from oscillator 5. The "error" signal from the phase detector is applied to a high-pass filter 6 which attenuates those flutter frequencies that are corrected by the speed control, whereas a low-pass filter 9 having the "error" signal applied to it attenuates the higher flutter frequencies that are corrected by varying the delay line. The output of filter 6 is enhanced in amplifier 7 and the magnified signal is used to identically control the delay introduced by delay lines 2 and 3 to eliminate the higher frequency components of flutter from the signals emitted by those lines. The output of filter 9 may be further smoothed if desired, and is employed to control the speed of the playback device to eliminate the lower frequency flutter components. At some intermediate flutter frequencies the correction exercised by the delay line may overlap the correction exercised by the speed control of the playback device. Where overlap occurs, the sum of the two corrections is arranged to precisely compensate for the flutter at the intermediate flutter frequencies.

The phase detector 4 is a time error measuring device, as it senses changes in the time difference between the signals from oscillator 5 and the signals emerging from the reference channel. The phase detector may be replaced by a speed error measuring device, such as a discriminator, and the output of the speed error measuring device can be integrated in a simple RC network to obtain a time error signal. The substitution becomes obvious when it is understood that the phase detector measures the distance between corresponding points of two signals, whereas a discriminator measures the deviation in frequency of a signal from a reference frequency; the phase detector measures position "error," whereas the discriminator measures speed "error." Those "errors" have a simple integral relationship; the distance error is the integration of the speed error with time. Thus, it is possible to replace the phase detector (a time error measuring device) with a discriminator (a speed error measuring device) and integrate the output of the discriminator to obtain a time error measurement.

The signal output of the information channel, obtained at terminal 8, is free from flutter because of the speed control of the playback device and the concurrent adjustment of both delay lines which derive their control from the reference channel. The delay provided for signals passing through line 2 is varied to cause the output of that line to be in phase with the output of reference oscillator 5. Preferably the phase difference between the output of line 2 and the signals of oscillator 5 is diminished to zero. The system performs properly where the delay line is varied so that its output bears a constant phase relationship to the oscillations of reference source 5. It is the constancy of the phase relationship that is important and not the elimination of the phase difference between the two compared signals. Where the phase relation is constant the output of delay line 2 has the same frequency as the reference oscillator 5, and if the phase difference between the two signals in something other than zero but is constant, one of the signals merely leads or lags the other by the amount of the difference. Delay line 2 is regulated to cause its output to have the same frequency as the original reference signal, and therefore, the output of delay line 3 has the frequencies its original signals had before recordation and playback because both delay lines provide the same delay.

Figure 2:
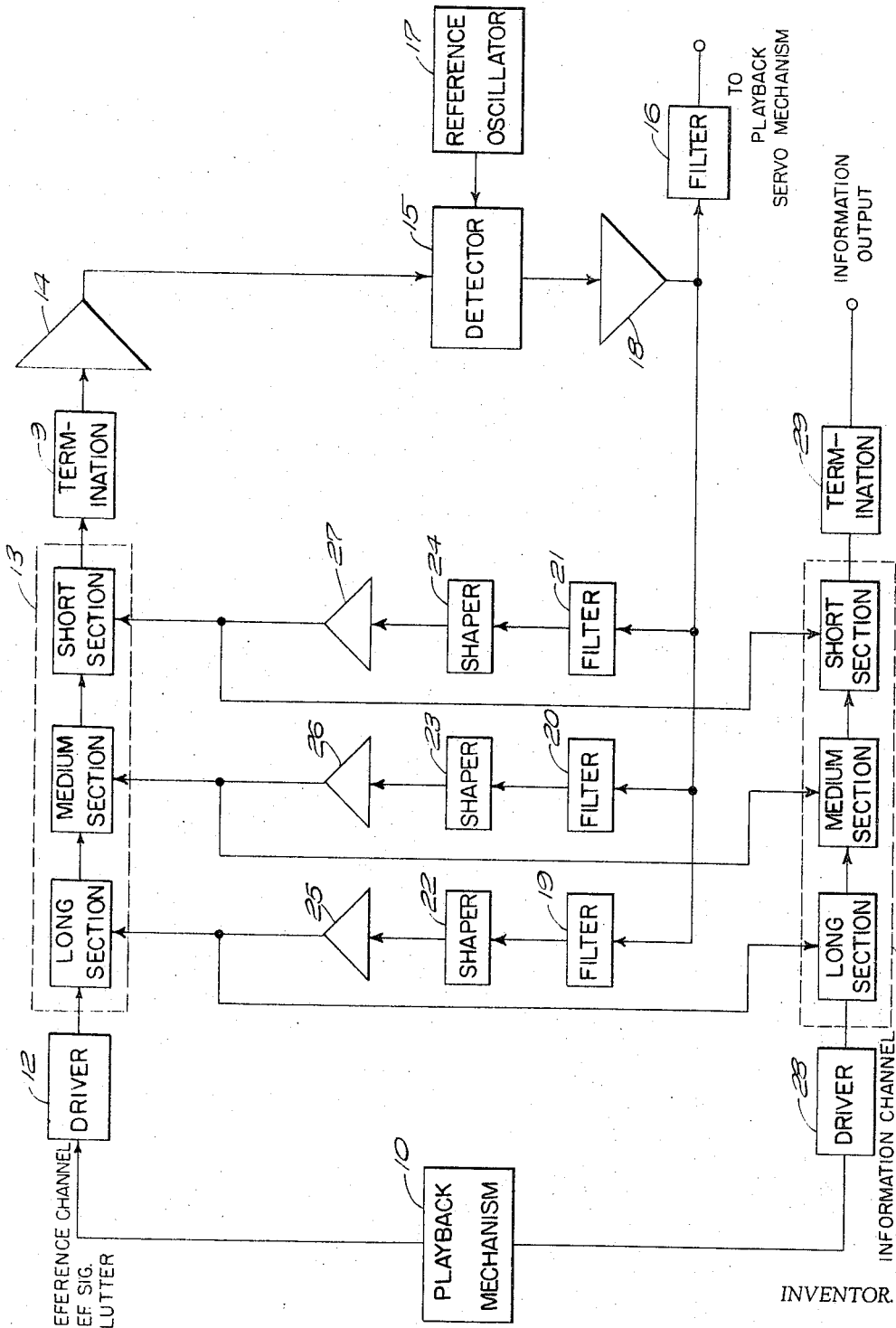
FIG. 2 shows the arrangement of a preferred embodiment of the invention.

FIG. 2 depicts a form of the invention in which the playback device 10 is of the type having a servomotor to control the speed at which the recording is "read." The reference signal from the playback device is applied through a driver 12 to delay line 13. The driver provides impedance matching to delay line 13 and also enhances the power of the reference signal to offset the attenuation caused by the signal's traverse of the delay line. Delay line 13 is constructed of a series of low-pass filter sections of the constant "k" type. Variable capacitors are employed in the filter sections, the capacitors being of the type which alter their capacitance in accordance with the voltage applied to them. By varying the voltage applied to the capacitors, the delay time of the line is changed. The delay line is divided into three sections, the delay imposed by each section being separately controlled.

The output of delay line 13 is fed through a termination network 9 to signal amplifier 14. The termination network provides an improved match between the input impedance of amplifier 14 and the terminal impedance of the delay line. The amplifier is applied to a phase detector 15.

In phase detector 15, the phase of the signal from amplifier 14 is compared with the phase of the signal from oscillator 17. Preferably, the frequency of oscillator 17 is identical with the frequency of the original reference signal before it was recorded on the tape. It was assumed that the original frequency of the reference signal was constant and, therefore, the frequency of oscillator 17 oughts to be highly stable to avoid impairing the fidelity of reproduction. Where the frequency of the output from delay line 13 differs from the frequency of reference oscillator 17, phase detector 15 emits an error signal to amplifier 18. The error signal may be either positive or negative, depending upon whether the frequency of the delay line's output is higher or lower than the frequency of the reference oscillator. The amplified error signal is applied to three low-pass filters 19, 20, and 21. Each of those filters has different high and low cut-off frequencies and the output of each filter controls a different section of delay line 13. The output of filter 19 controls the first and longest section of the delay line, the output of filter 21 controls the third and shortest section of the delay line, and the output of filter 20 controls the intermediate section of the delay line. Filter 19 controls the section of the delay line capable of introducing the longest delay, and that filter has a high cut-off frequency, for example, of 200 cycles and a low cut-off frequency of 3 cycles. The upper cut-off frequency of filter 20, typically, is 1 kc. with the lower cut-off at 50 cycles/sec. The upper cut-off frequency of filter 21 may be 15 kc. with the lower cut-off at 200 cycles/sec. Hence, error signal frequencies of 200 cycles or less cause the first and longest section to delay the signal in the reference channel, error signal frequencies between 50 and 1,000 cycles affect the midsection of the delay line, and error signal frequencies above 200 cycles to 15 kc. cause the third and shortest section to delay the signal in the reference channel.

The output of filters 19, 20, and 21 are respectively applied to shapers 22, 23, and 24. Each shaper alters the signal from its filter to compensate for the non-linear characteristics of the variable capacitors in the delay line. From the shaper, the modified error signal is fed to an amplifier, 25, 26, or 27, which controls the voltage applied to the plates of the variable capacitors. The capacitance of the variable capacitors is a function of the voltage across the capacitors. By altering the capacitance of the delay line, the signal traveling through the delay line is caused to propagate at a changed velocity, and hence that signal is delayed in accordance with the voltage controlling the capacitors of the delay line.

Amplifiers 25, 26, and 27 have push-pull outputs which are coupled to their respective sections of delay line 13 so as to control the voltage impressed across the variable capacitors in those sections. The outputs of those amplifiers are impressed in the same manner on a delay line 11 whose construction is identical with that of delay line 13. Recorded data from playback mechanism 10 is applied to delay line 11 through a driver 28, and the output of the delay line is taken through a termination network 29 which matches the terminal impedance of the delay line to whatever device is connected to the information output terminal.

In the system depicted in FIG. 2, delay lines 11 and 13 are concurrently controlled and both delay lines are made to respond in the same manner to the control signals. When the signals from delay line 13 and reference oscillator 15 have the same frequency and are in phase, the delay lines are then providing the correct delay to compensate for the flutter in the signals issuing from the playback mechanism 10. The system, therefore, compensates for flutter whether that flutter was introduced during recording or is due to the playback mechanism.

The length (and thus the size and cost) of the delay line increases inversely proportional to the lowest flutter frequency it compensates. To compensate for ferquencies below a nominal 3 cycles per second in one implementation would require a delay of inordinate length. Compensation for flutter frequencies below 3 cycles is, therefore, accomplished by regulating the speed of the playback mechanism. Where the playback mechanism is a device which causes a tape to be transported past a "reading" head, the tape is customarily driven by a capstan powered by an electric motor. The speed of the electric motor may be regulated by a servomechanism which responds to a control signal. The control signal can be derived from the detector 15 in FIG. 2 by employing a low-pass filter 16 having a cut-off frequency sufficiently exceeding the nominal 3 cycles per second (e.g., 30 cycles per second) to allow adequate control frequency overlap. The output of filter 16 may then govern a servomechanism which causes the speed of the capstan drive to compensate for low frequency flutter and for wow.

*Phase detector*

Figure 3:
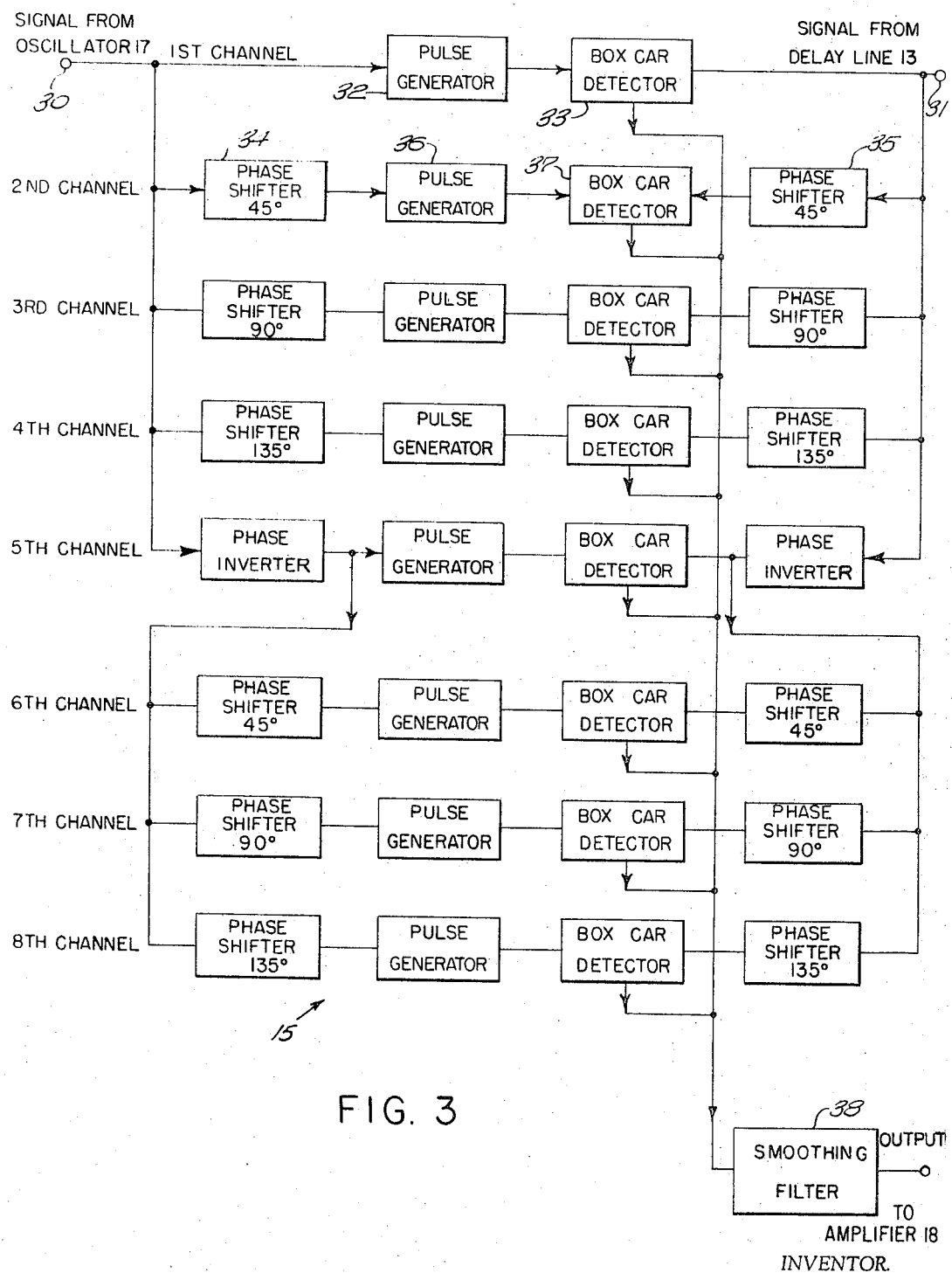
FIG. 3 is a block diagram of the internal arrangement of the detector in FIG. 2.

A phase detector suitable for use as detector 15 in the system shown in FIG. 2 is a device termed a "Multichannel Phase Detector." FIG. 3 depicts a diagrammatic arrangement of such a device having eight channels. The reference signal from oscillator 17 is impressed at terminal 30. The signal from that oscillator has a constant frequency, arbitrarily assumed to be 10 kc. The signal from variable delay line 13 is impressed at terminal 31. It is arbitrarily assumed that the flutter and wow can cause the input signal at terminal 31 to vary between 5 and 15 kc., although the nominal recording frequency was 10 kc.

During every cycle of the reference signal, the input signal (that is, the signal impressed at terminal 31) is sampled eight times. The first channel has a pulse generator 32 whose input is coupled to terminal 30 and whose output is coupled to a box car detector 33. The pulse generator is a device which emits a pulse when its input signal exceeds a threshold value. The pulse generator, by way of example, may have a Schmitt trigger circuit which generates a trigger pulse when the reference signal passes through the zero axis in the positive direction (that is, when the signal swings from negative to positive through the zero axis). The leading edge of the Schmitt trigger pulse is differentiated to obtain a "spike," and the spike is employed to trigger a generator, such as a monostable blocking oscillator, which in response to each trigger emits a pulse of predetermined duration. The pulse from pulse generator 32 is applied to box car detector 33 and causes that detector to sample the signal at terminal 31.

Figure 4:
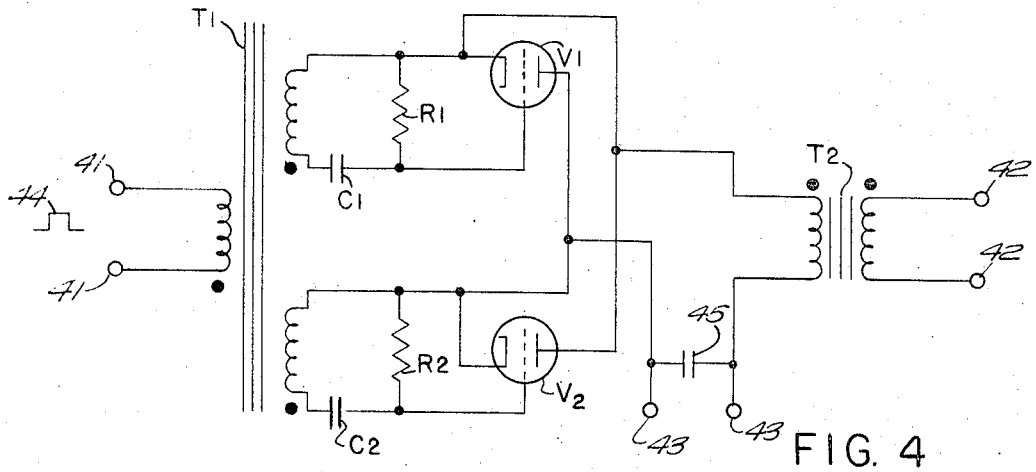
FIG. 4 is a circuit diagram of a box car detector.

A typical box car detector circuit is shown in FIG. 4. The pulse from generator 32 is applied through transformer T1 to the grids of triode tubes V1 and V2. Each of the grids has an R-C grid-leak bias circuit. Capacitor C1 and resistor R1 constitute the grid-leak bias circuit for the grid of tube V1, and capacitor C2 and resistor R2 constitute the grid-leak bias circuit for the grid of tube V2. During the existence of a pulse 44 at terminals 41, the two tubes are simultaneously placed in a condition to conduct current. During the existence of sampling pulse 44 at terminals 41, a signal impressed at terminals 42 causes either tube V1 or V2 to conduct, depending upon the polarity of the signal. Capacitor 45 thereupon charges or discharges through the low impedance of the conducting tube until the voltage across that capacitor is equal to the instantaneous voltage across the secondary of transformer T2. Upon the decay of pulse 44, the grid-leak bias causes tubes V1 and V2 to be cut off until the next sampling pulse is impressed at terminals 41. During the cut-off interval, the charge in capacitor 45 remains relatively unchanged by connecting terminals 43 to a high impedance device.

Referring now to FIG. 3, assuming that the input signal at terminal 31 has the same frequency as the reference signal, pulse generator 32 emits a short duration sampling pulse just as the reference signal crosses the zero axis. Where the input signal and the reference signal are in phase, box car detector 32 has a zero or negligibly small output because, at the moment the sample is taken, the input signal swings through its zero axis. Where the phase of the input signal is shifted relative to the reference signal, the sample is taken when the input signal's instantaneous amplitude is something other than zero and the output of the box car is either a negative or positive D.C. signal, depending upon whether the input signal leads or lags the reference signal.

In the second channel of the phase detector, the reference signal is applied to a phase shifter 34 which shifts the phase of the signal 45°. Similarly, the input signal at terminal 31 is applied to a phase shifter 35 identical with phase shifter 34. When the frequencies of the reference and input signals are the same, it takes the same time to shift each signal by 45°. However, where the frequency of the input signal is higher than the frequency of the reference signal, the input signal is shifted through more than 45° in the time that the reference signal is shifted 45°. As a corollary, where the frequency of the input signal is lower than the frequency of the reference signal, the input signal is shifted through less than 45° in the time that the reference signal is shifted 45°. It is only when the frequencies of the two signals are equal that equal phase shifts occur in the same time.

Figure 5:
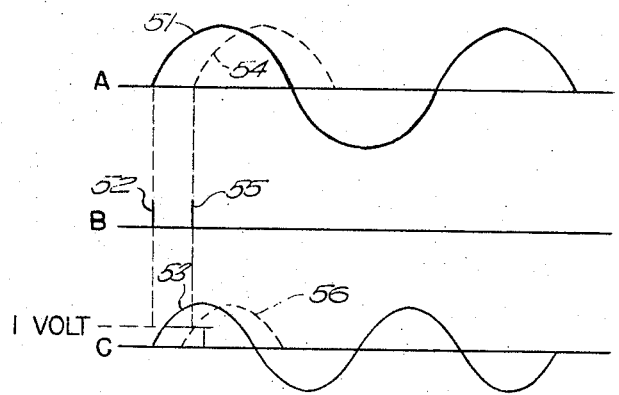
FIG. 5 depicts waveforms occurring in the detector of FIG. 3.

The waveforms in FIG. 5 illustrate the functioning of the first and second channels. The full line sine wave 51 depicted in FIG. 5A represents the reference signal applied to terminal 30. At the positive going cross-over of waveform 51, pulse generator 32 emits a pulse 52 (FIG. 5B) which causes detector 33 to sample the signal at terminal 31. Assuming the signal at terminal 31, because of flutter, has a higher frequency than the reference signal, its waveform is represented by the full line wave 53 of FIG. 5C. Where the zero cross-over of waveform 53 occurs simultaneously with the zero crossing of reference signal 51, box car detector 33 samples the signal at terminal 31 when its amplitude is zero. Detector 33, therefore, has a zero volt output.

The broken line sine wave 54 of FIG. 5A represents the reference signal after it has been shifted 45° by phase shifter 34 in the second channel. Waveform 56 of FIG. 5C represents the output of phase shifter 35 which is shifted 45° relative to the signal 53 at terminal 31. It can be observed that, because the input signal has a higher frequency than the reference signal, the time required for the reference signal to be shifted 45° is longer than the time required for the 45° shift of the input signal. When waveform 54 passes through its positive zero crossing, generator 36 in the second channel emits pulse 55 which causes box car detector 37 to sample the signal (waveform 56 of FIG. 5C) at the output of phase shifter 35. At the occurrence of pulse 55, the amplitude of waveform 56 is a positive quantity, here assumed to be 1 volt. Box car detector 37, therefore, provides an output signal of substantially 1 volt.

Each of the other signal channels in FIG. 3 is similar to the second channel except that the phase shifters in the third channel shift the signals by 90°, the phase shifters in the fourth channel shift the signals by 135°, etc. That is, the phase shifters in each succeeding channel effect a 45° greater phase shift than the phase shifters in the preceding channel. The phase shifting devices in the fifth channel can be conventional phase inverters rather than phase shift networks since in the fifth channel the signals are required to be 180° out of phase with the signals at terminals 30 and 31. The output of the phase inverters can then be employed to furnish the inputs to the phase shifters in the succeeding channels. Thus, the phase shifters in the sixth channel need effect a phase shift of 45° in order to have their outputs shifted by 225° relative to the corresponding signals at terminals 30 and 31. Similarly, the phase shifters in the seventh channel need effect a phase shift of 90° to have their outputs shifted by 270° relative to the corresponding signals at terminals 30 and 31, and the phase shifters in the 8th channel need effect a phase shift of only 135° to have their outputs shifted by 315° relative to the corresponding signals at terminals 30 and 31.

Through the arrangement depicted in FIG. 3, the input signal is effectively sampled eight times for every cycle of the reference signal. The outputs of the box car detectors are fed into a smoothing filter 38 and the output of the filter is employed to control the delays in the variable delay lines in a manner causing the output of delay line 13 to have the same frequency as reference oscillator 17.

*The delay line*

Figure 6:
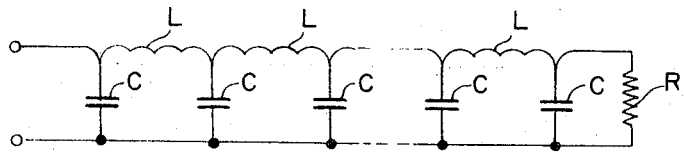
FIG. 6 is a symbolic representation of one of the principal sections of a delay line.

FIG. 6 is a symbolic representation of any one of the three principal sections of the delay line. The delay line principal section there shown is constituted by a series of LC (inductance-capacitance) sections. In the preferred embodiment the line's capacitance is varied by employing capacitors of the type whose capacitance is controlled by the voltage applied across the capacitor. Such devices are termed "varactors." The delay provided by the LC delay line is approximately proportioned to $N\sqrt{LC}$ (where N is the number of LC sections in the delay line) and therefore, varying the capacitance C results in a similar variation in the total delay through the line.

The delay line of FIG. 6 is terminated by a resistance R whose value is chosen to match the characteristic impedance of the delay line. The characteristic impedance of the delay line, however, varies with the variation of the line's capacitance and resistor R is, preferably, chosen to be equal to the mean characteristic impedance of the line. Where a more precise impedance match is desired, the resistor R can be a variable resistance and a control mechanism can be provided to cause the resistance R to change with changes in the capacitance of the delay line in a manner causing the resistance R to match its value to the characteristic impedance of the line.

Figure 7:
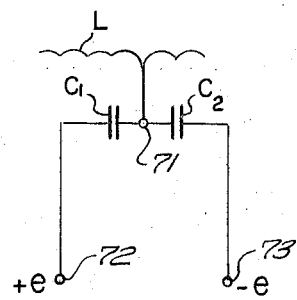
FIG. 7 illustrates the manner of applying the control signal to the variable capacitors in the delay line.

Assuming the capacitors marked C in FIG. 6 are of the varactor type, the control signal applied to those capacitors must be impressed without distorting the signal is to change the line's capacitance. In order to provide signal must be isolated from the signal propagating along the delay line so that the only effect of the control signal is to change the line's capacitance. In order to provide the desired isolation, the scheme shown symbolically in FIG. 7 is employed. Each capacitor C in FIG. 6 is actually comprised of two varactors C1 and C2 as indicated in FIG. 7. The inductor L is connected to the junction 71 between the two varactors. The control signal is provided by a push-pull amplifier (i.e., the amplifier 25, 26 or 27 of FIG. 2) and that signal is balanced to ground. The control signal is, for example, applied at terminals 72 and 73 of FIG. 7. Because the signal is balanced to ground, when the positive signal $+e$ appears at terminal 72, an equal negative signal $-e$ appears at terminal 73. To the inductor L, the potential at junction 71 will not appear to move, whereas the capacitance of the varactors changes because of the applied balanced signal.

A typical delay line was constructed of 108 toroid inductors and 432 variable capacitors. Each toroid had a value of 10 millihenrys with a shunt capacitance of 140 picofarads and a resistance of 1.3 ohms. The variable capacitors were of the In 946 type. The delay line, as indicated in FIG. 2, is divided into three sections to permit individual control of each section. The long section has 76 LC combinations, the medium section has 21 of such combinations, and the third section has 11 LC combinations.

In the preferred embodiment of the delay line, the capacity C of the line was varied by the control signal.

Those familiar with electronics and delay lines are aware that varying either the inductance L or the capacity C or a combination of L and C causes an alteration in the delay time. It is at once obvious that a suitable delay line could be constructed in which the inductance of the line were controlled, rather than its capacity, or that a combination of the two controllable parameters could be employed.

FIG. 8 depicts an implementation of the invention employing the combination of a rapidly variable delay element with a speed controlled playback device to remove wow and flutter. In this embodiment of the invention the recorded reference signal is used to control both the speed of the playback device and the variation of the delay element.

For expository reasons, it is assumed that the original reference signal (that is, before being recorded) was of constant frequency. On being recorded simultaneously with the data, both data and reference signal are modulated in the same way by wow and flutter. It is not necessary that the reference signal and the data signal be recorded on separate tracks since the signals may be recorded on a common track by multiplexing (viz., time sharing) or by frequency channel allocation (viz., sub-carrier operation). The playback device 80 has its output coupled to two channels, one channel having applied to it the output obtained from the recorded reference signal and the other channel being fed by the output obtained from the recorded data signals. The two outputs are simultaneously obtained from the playback mechanism so that those outputs contain the same wow and flutter disturbances. A pair of variable delay lines 81, 82 are provided which are arranged to provide the same delay. Delay lines 81 and 82 may be similar to the delay lines 13 and 14 previously described in connection with the embodiment of FIG. 2.

The signal in the reference channel of FIG. 8 is impressed upon delay line 81 and upon discriminator 83. That discriminator measures the deviation of the reference signal from its original frequency and emits an error signal which, after being magnified in amplifier 84 and filtered in filter 85 to remove undesired components due to the higher flutter components, is employed to regulate the speed of the playback device to correct for wow and the lower flutter frequencies. The discriminator 83, amplifier 84 and filter 85 cooperatively result in a means for creating a signal which is used for speed control, said signal being directly applied to the playback device 80, as indicated in FIG. 8.

In the information channel the signal is applied to variable delay line 82, whereas in the reference channel the signal is applied to variable delay line 81. After transmission through delay line 81, the signals emitted are impressed upon a discriminator 86 which measures the deviation from the original frequency of the reference signal. The output of discriminator 86 is converted to a time error signal by integration in integrator 87 and the error signal is applied to amplifier 88. The amplified error signal is filtered and shaped and is used to vary the delay imposed in delay lines 81 and 82. While the filtering and shaping device is indicated as a single block 89 in FIG. 8, it should be understood that each delay line may actually be comprised of a number of sections, as indicated in FIG. 2, and therefore the means for controlling each section may use the scheme depicted in FIG. 2.

The signal obtained from the output of delay line 82 is free of flutter and wow because of the speed control exercised by discriminator 83 and the concurrent adjustment of both delay lines which derive their control from discriminator 86. The control signal from discriminator 86 may be passed through such filtering and stabilizing networks as are required to suppress the wow and lower frequency components of flutter which are compensated by control of the speed of the playback device. The higher frequency components of flutter are eliminated by regulation of the delay introduced in the variable delay lines.

Figure 9:
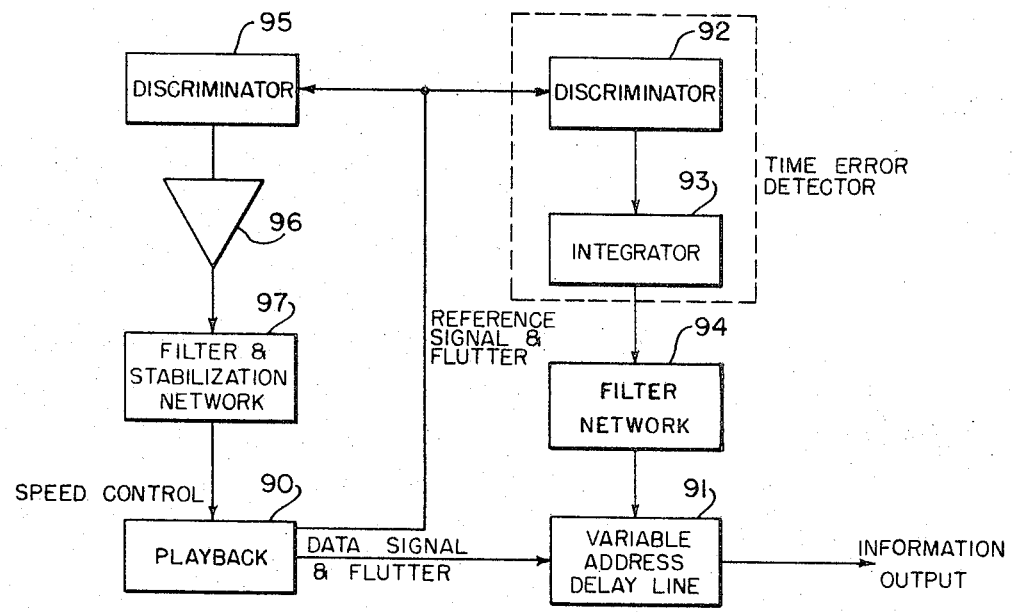
FIG. 9 illustrates an embodiment of the invention in which compensation is attained without employing the matched delay lines of the preceding embodiments.

In the embodiment of the invention illustrated in FIGS. 1 and 8 a pair of matched variable delay lines are employed. FIG. 9 depicts a flutter reduction system having but one variable delay line 91. In the embodiments of FIGS. 1 and 8 the variable delay lines are either of the variable propagation rate type or the variable access type. The variable propagation rate delay line has been described in connection with FIGS. 6 and 7 and essentially is a device in which a control signal regulates the rate at which an electrical wave propagates along the line so that the wave can be caused to move faster or slower in accordance with the control signal. A variable access line is a delay line in which the velocity of propagation is fixed but the point at which the signal is taken from the line is variable. In a simple case, the variable access line may have a number of output taps spaced along it with a slide wire (or its equivalent) that is moved back and forth along the taps to pick off information, the wire being moved forward where a shorter delay is required and being moved backward when a longer delay is desired. Either of those two types of delay lines operate satisfactorily in the embodiments of FIGS. 1 and 8, provided adjustments in the filter and shaping networks are made for each type of delay line to insure dynamic stability in the control loop.

In the system depicted in FIG. 9, the delay line 91 is of a type known as the variable address delay line. In this type of delay line the velocity of propagation is fixed. The line has a number of taps, and the signal is put into the line through a slide wire which can be positioned on a selected tap. The point at which the signal is put into line is controlled therefore by the position of the slide wire. In lieu of a slide wire, each of the taps can be connected to a switching station, and the input signal can be directed to the appropriate station by a fast acting switching mechanism. The output of the delay line is taken at the line's termination so that the delay introduced by the line is dependent upon the point at which the signal is put into the line by the slide wire or switching mechanism.

In the information channel of FIG. 9, the data signal from playback device 90 is applied to the variable address delay line 91 at the input point determined by a control signal from a time error detector.

In the reference channel the reference signal output from playback device 90 is applied to discriminator 92 to obtain the speed error (viz., the deviation of the reference signal from its original frequency). The speed error output of the discriminator is converted to a time error signal by integration with respect to time in integrator 93. The output signal of the integrator is a function of the total time the playback signal is ahead or behind the position it would have had without wow and flutter disturbance, and this output signal is fed through filter network 94 before being applied to variable address delay line 91. In the system of FIG. 9, the time error detector consists of discriminator 92 and integrator 93. The discriminator measures the velocity error due to wow and flutter, and the integral of the velocity error is the distance along the tape or recording medium in the playback device. Distance error is equivalent to time error in that controlling the delay time of delay line 91 causes the signal propagating in the delay line to emerge corrected for wow and flutter.

The time error detector comprised of discriminator 92 and integrator 93 must have some low frequency cut off so that the delay line is not required to be capable of being varied over an infinite range of delay times. The wow and low frequency components of flutter contribute large time error variations and therefore would require an inordinately long delay line. The wow and low frequency components of flutter are removed by a speed control loop having a discriminator 95, an amplifier 96 and a filter network 97. The operation and construction of the loop for controlling the speed of the playback device is the same as the speed control loop previously described in connection with the embodiment of FIG. 8.

Figure 10:
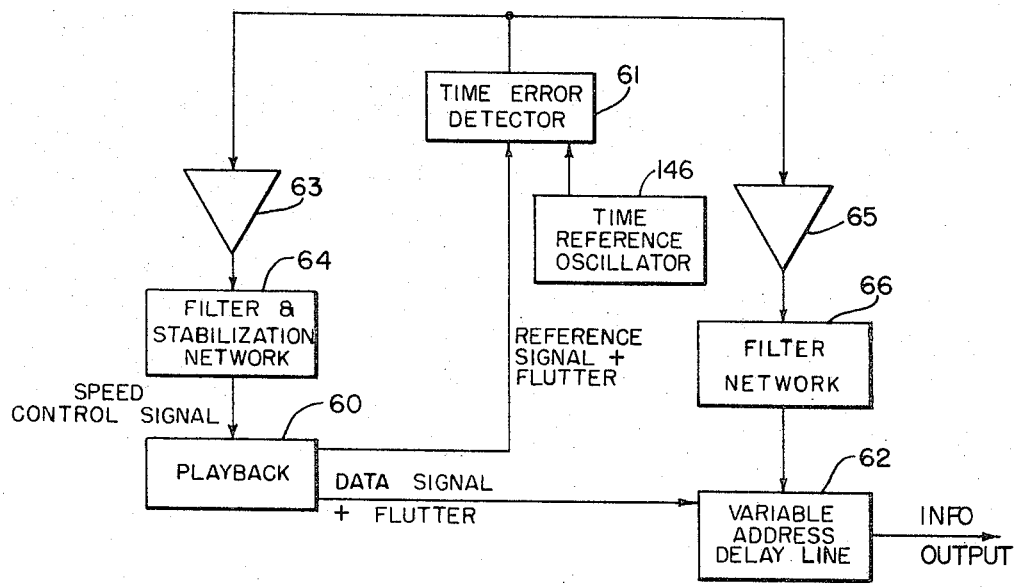
FIG. 10 is a generalized scheme of an embodiment employing a single delay line and in which the time error detector is part of the control loop of the delay line as well as the speed control loop of the playback device.

A more generalized scheme of the invention depicted in FIG. 9 is shown in FIG. 10. The time error detector 61 indicated in FIG. 10 is in the speed control loop of playback device 60 and provides the control signal for variable address delay line 62. In the scheme of FIG. 10 the separation of low frequency and D.C. control signals, to govern the speed of the playback device, and the higher frequencies, to govern the delay introduced by the delay line, is observed as it is in the system of FIG. 9. The speed control loop, in addition to the time error detector, has an amplifier 63 which feeds a filter and stabilizing network 64 whose output controls the speed of the playback device. The variable address delay line has its delay time controlled by the output of the time error detector, after that output has been passed through an amplifier 65 and a filter network 66.

Figure 11:
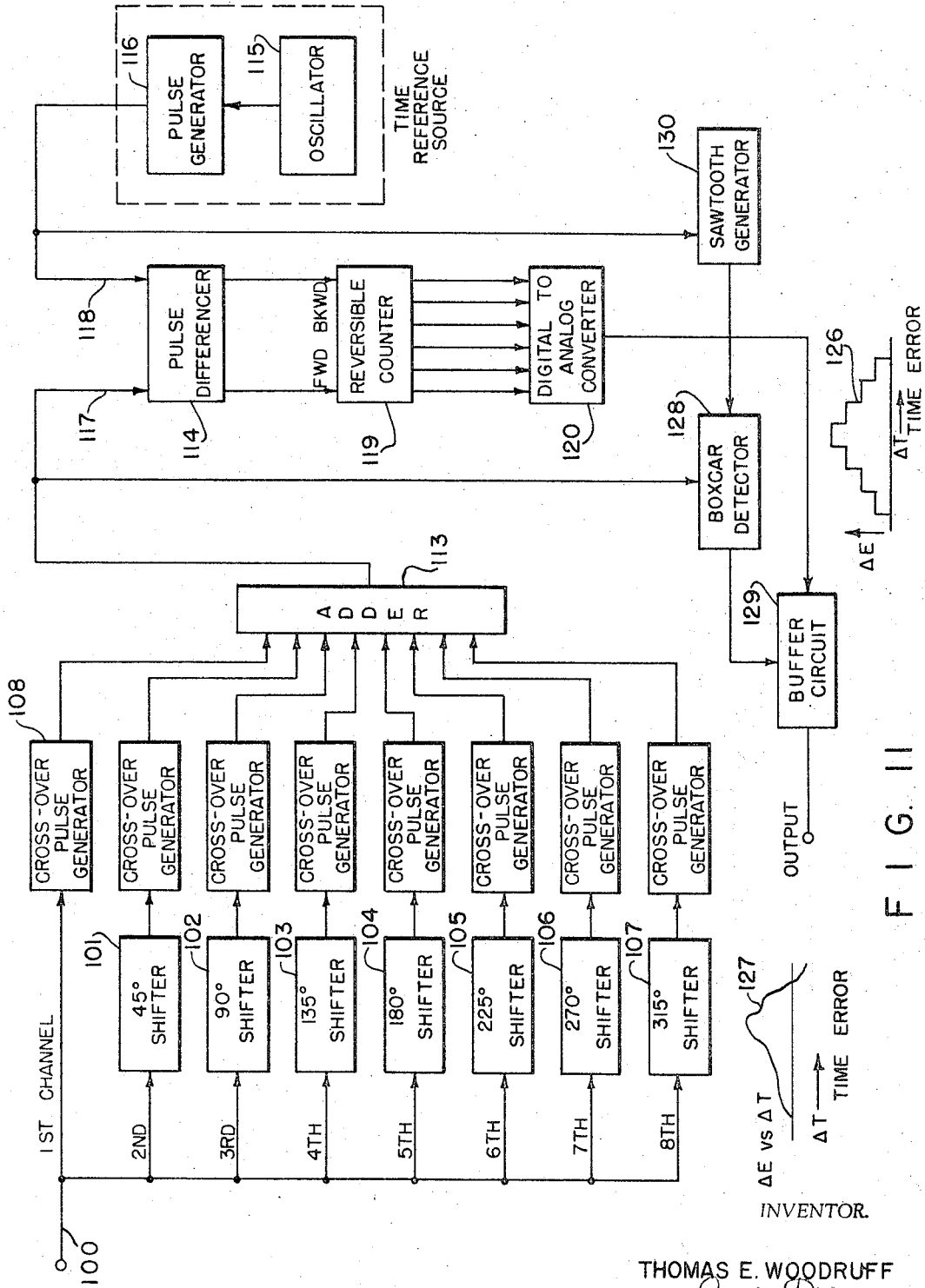
FIG. 11 depicts the scheme of a time error detector useful as a component of the invention.

FIG. 11 is a schematic representation of a time error detector capable of determining the time error between the recorded reference signal and a signal whose frequency is the same as the original reference signal, even where the time error is many cycles. It has been determined that flutter can cause a time error that is many cycles of the frequency of the reference signal. The time error detector of FIG. 11 differs from the conventional phase detector in that the conventional phase detector measures time error by repeating the same error voltage every 360° of error and, therefore, does not distinguish one cycle of error from multiple cycles of error. That is, the conventional phase detector gives the same output indication whether the phase difference, for example, is 10°, 370°, 730°, or any multiple of 360° to which 10° is added.

In the time error detector of FIG. 11, the recorded signal from the reference signal channel (that is, the reference signal and flutter) is applied at terminal 100. The signal at terminal 100 is shifted by phase shifters 101 to 107 to obtain eight signals (one for each channel) that are successively displaced in phase 45° more than the signal in the preceding channel. The signal in the 1st channel is applied directly (viz., unshifted) to a cross-over pulse generator 108. In each of the other channels the phase shifted signal is applied to a similar cross-over pulse generator. Each time the signal applied to a cross-over pulse generator swings through the zero axis in the same direction (that is, either from negative to positive or from positive to negative), the cross-over pulse generator emits a pip.

The internal arrangement of a typical cross-over pulse generator is schematically depicted in FIG. 12. Conventionally, a cross-over pulse generator has an amplifier 109 which greatly magnifies the applied signal as indicated by the waveform of FIG. 13A. The amplified signal is severely distorted by a symmetrical clipper 110 to obtain the substantially square wave of FIG. 13B. The square wave is passed through a differentiator 111 to obtain the spikes of FIG. 13C. As only one cross-over spike is needed for each cycle of the input signal, limiter 112 is set to permit only the positive-going spikes to pass as indicated by the pips of FIG. 13D.

For each cross-over of the signal at terminal 100 (FIG. 11), eight pips are generated, one in each channel, the pips being evenly spaced in time. The outputs of the cross-over generators are applied to an adder 113 which permits the pips to be transmitted to one input of a pulse differencer 114. The other input of the pulse differencer is connected to a time reference source which provides periodically recurring timing pulses at a rate eight times greater than the frequency of the original reference signal (i.e., the frequency of the reference signal before it was recorded). The time reference source, by way of example, may employ an oscillator 115 to trigger a pulse generator 116, the output of the pulse generator providing a pip, viz., a pulse of short duration, for each cycle of the oscillator. Setting the frequency of oscillator 115 eight times higher than the frequency of the original reference signal, therefore, provides the required number of timing pips.

Where the signal impressed at terminal 100 is free of wow and flutter, the pips emitted by the cross-over generators just offset the number of pips emitted from the time reference source. Distortion of the signal at terminal 100 caused by wow and flutter results in a change in the rate at which pips are generated by the cross-over generators.

Pulse differencer 114 is a mechanism which responds to differences in the rate of pulses applied to its inputs 117 and 118 by emitting signals that can appear on either of two output lines. A conventional pulse differencer is depicted in greater detail in FIG. 14. That device consists of a flip-flop 121 whose outputs are coupled through delay networks 122 and 123 to respective gates 124 and 125. For ease of exposition, line 117 is termed the "set" input line and line 118 is termed the "reset" input line. The "set" input of the flip-flop is coupled to gate 124, whereas the "reset" input is coupled to gate 125.

Assuming the flip-flop of FIG. 14 initially is in a state such that gate 125 is enabled and gate 124 is blocked, a pulse applied on the "set" input causes flip-flop 121 to change states and the flip-flop emits an enabling signal to delay line 122 and a disabling signal to delay line 123. Due to the delay inserted by line 122, the pulse on the "set" input decays before gate 124 is enabled and no signal appears at either output. Gate 124 becomes enabled and gate 125 is blocked. If the next occurring pulse is impressed on line 118, it resets flip-flop 121 but is not able to pass through disabled gate 125. By the time an enabling signal, due to the resetting of the flip-flop, passes through delay line 123, the pulse at the reset input has decayed. Subsequently gate 125 becomes enabled and gate 124 is disabled. So long as pulses alternate at the "set" and "reset" inputs, no output is emitted by the pulse differencer. If, however, two successive pulses appear on the "set" input, the second occurring pulse passes through gate 124 and appears at the +output. If three successive pulses appear at the "set" input, the second and third pulses pass through gate 124 and appear at the +output. Similarly, where two successive pulses appear at the "reset" input, the second occurring pulse passes gate 125 and emerges at the —output. The pulse differencer, therefore, determines the difference in the rates of the pulses applied at the "set" and "reset" inputs. If the "set" rate is higher, the difference appears at the +output; if the "reset" rate is higher, the difference appears at the —input; if the rates are equal, no output appears.

The +output line of the pulse differencer is coupled to the forward input of reversible counter 119 (FIG. 11) and the —output line is connected to the backward input of that counter. A pulse emitted on the +output line causes the count in the counter to increase by one increment, whereas a pulse emitted on the —output line of the pulse differencer causes the counter to reduce its count by one increment. Reversible counter 119 can be a conventional digital counter of the type having parallel output lines. The output of the reversible counter is fed to a digital to analog converter 120 which converts the digital count to an analog (i.e., equivalent) voltage. Since the analog voltage varies by increments, the output of the converter is a stepped voltage of the type indicated by waveform 126. The voltage amplitude of the stepped waveform is proportional to the time error of the recorded reference signal as measured against the timing signals provided by the time reference source.

The steps in the output (viz., stepped waveform 126) may be removed to obtain a smooth curve of voltage versus time error, of the nature of waveform 127. To obtain a smooth curve, the output of box car detector 128 is added in a buffer circuit 129 to the output of converter 120. A sawtooth wave generator 130 periodically generates a sawtooth wave at a frequency determined by the pips from the time reference source. The output of the sawtooth wave generator is applied to box car detector 128 and that detector is gated by the pulses emitted by the cross-over pulse generators. The output voltage of detector 128 when plotted against time error is a repetitive sawtooth signal. The repetitive sawtooth signal, when added to the stepped waveform generated by converter 120, results in a smooth curve of the type indicated by waveform 127.

The sampling rate of the box car detector determines the ripple frequency in the error signal caused by changes in the error signal. Thus, the error signal versus time curve (waveform 127) reflects a relatively slowly changing error signal. The minimum ripple frequency is eight times the frequency of the recorded reference signal since the gating pulses occur at that high frequency. Due to that high ripple frequency, the ripple may be easily filtered out of the error signal without causing an undue time delay in correcting flutter.

Figure 15:
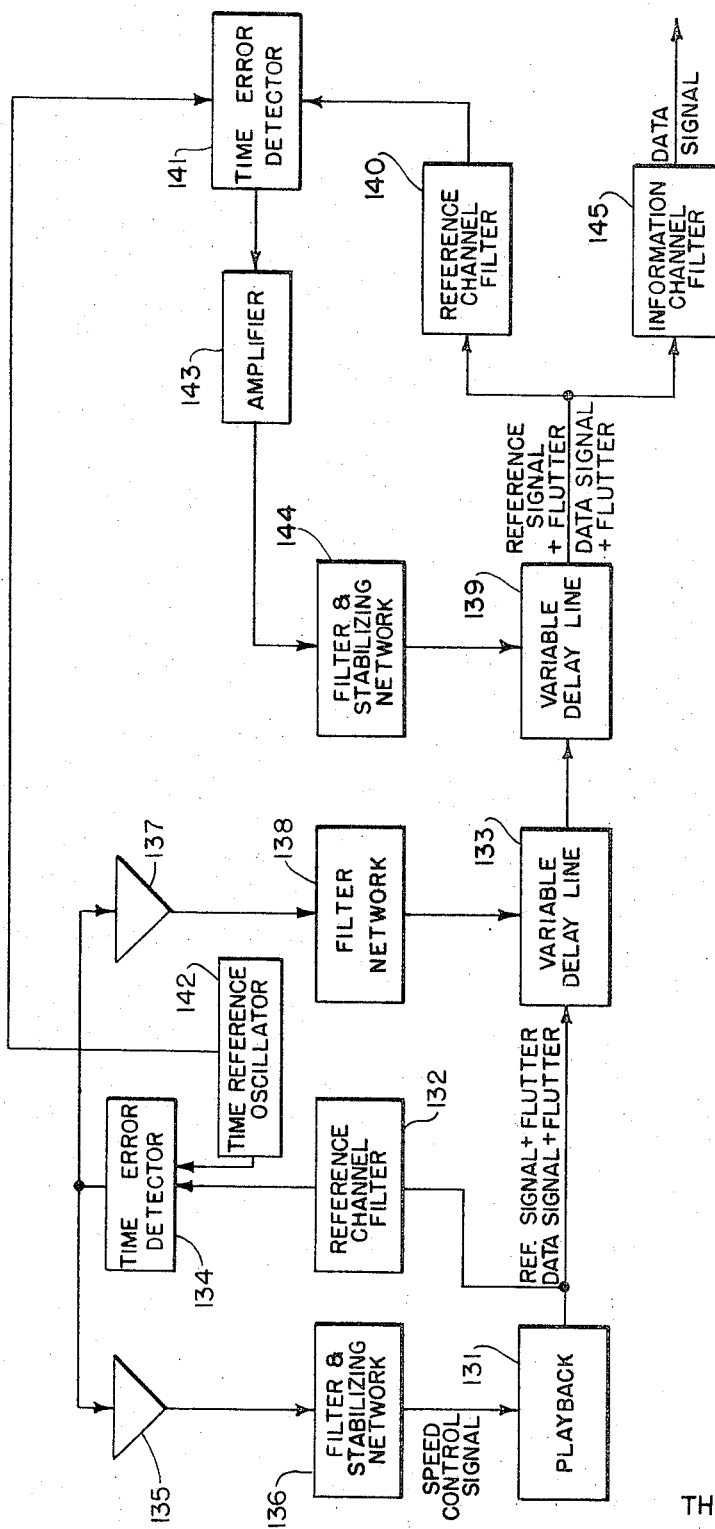
FIG. 15 shows the schematic arrangement of another embodiment of the invention.

The schematic diagram of FIG. 15 depicts a flutter compensation system that is more complex than the embodiments previously described. In the embodiment of FIG. 15 the data signal and reference signal are assumed to be recorded on a single track by subcarrier operation. That is, one of the signals modulates a subcarrier so that it can readily be separated from the other signal by filtering. On being played back by playback device 131, only the reference signal, with its flutter, is permitted to enter the reference channel through a filter 132 while the combined signal (viz., the reference signal and the data signal) is fed into a delay line 133 of the variable address type. Both the reference signal with its flutter and the data signal with its flutter proceed into the variable delay line.

The output of the reference channel filter is applied to time error detector 134 and, as described in connection with the embodiment of FIG. 10, the output of the time error detector is used to govern the speed of playback device 131 and to regulate the delay introduced by delay line 133. The speed control loop of the playback device includes reference channel filter 132, time error detector 134, amplifier 135, and the filter and stabilizing network 136 whose output controls the speed of the playback device. Variable address delay line 133 has its delay regulated by the output of time error detector 134, after that output has passed through amplifier 137 and the filter network 138. The separation of low frequency and D.C. control signals, to govern the speed of the playback mechanism, and the higher frequencies, to govern the delay of the variable delay line, is observed as it is in the system of FIG. 10.

In the signals emerging from variable delay line 133 all of the measurable flutter in the signal may not have been removed. Assuming, for example, that the flutter may have been reduced by a ten-to-one ratio, it may be desired to reduce the flutter still further. To accomplish that purpose, the signals emerging from delay line 133 are fed into a second variable delay line 139 of the variable propagation rate or variable access type. The output of delay line 139 is the combined data signal and reference signal. A second reference channel filter 140 suppresses the data signal and transmits the reference signal to a second time error detector 141. Both time error detectors can obtain their reference timing signals from oscillator 142. The output of time error detector 141 is amplified in amplifier 143 and applied through a filter and stabilizing network 144 to regulate variable delay line 139 to further reduce the flutter in the signals emerging from that line.

Time error detector 141 and amplifier 143 are comparable, respectively, to detector 15 and amplifier 18 of FIG. 2. The filter and stabilizing network represented by box 144 in FIG. 15 corresponds to the filters, shapers, and amplifiers in FIG. 2 which directly control the delay of variable delay lines 11 and 13.

To obtain the data signal unaccompanied by the reference signal, the output of variable delay line 139 is passed into information channel filter 145. The reference signal is suppressed by filter 145 and the data signal emerges substantially free of flutter.

While preferred embodiments of the invention have been described, it is evident to those knowledgable in the electronics arts that other mechanizations of the invention are feasible. For example, the detector 15 of FIG. 2 need not be of the construction delineated in FIG. 4 but may be a device, such as the time error detector of FIG. 11, which can compare the output from the reference channel (FIG. 2) with the output of the oscillator 17 and develop a signal related to the difference between the compared signals.

With appreciation of the modifications that can be made in the structural components without departing from the underlying concept of the invention, it is intended that the scope of the invention not be restricted to the precise details of the embodiments described above, but rather that the invention be accorded the scope delimited by the appended claims.

What is claimed is:

1. Flutter compensating apparatus comprising:
  (a) a playback device for simultaneously providing a reference signal and an information signal,
  (b) a time error detector, the reference signal output of the playback device being coupled to the time error detector to cause the time error detector to provide an output signal related to the flutter of the reference signal,
  (c) a variable delay device having its delay time controlled by only the high frequency component of the output of the time error detector,
  (d) means for feeding the information signal from the playback device into the delay device, and
  (e) said delay device and said time error detector comprising a closed loop feedback system whereby the high frequency output of said time error detector is continuously fed back to the delay device.

2. High fidelity apparatus for compensating for distortion in a recorded information signal associated with a simultaneously recorded reference signal, the apparatus comprising:
  (a) a device for simultaneously playing back the reference signal and the information signal,
  (b) a time error detector, the reference signal from the playback device being applied to the time error detector, the time error detector providing an output signal related to the distortion of the reference signal.
  (c) a variable delay device having its delay time controlled by only the high frequency component of the output of the time error detector,
  (d) means for applying the information signal from the playback device to the input of the delay device, and
  (e) said delay device and said time error detector comprising a closed loop feedback system whereby the high frequency output of said time error detector is continuously fed back to the delay device.

3. High fidelity apparatus for compensating for distortion in a recorded information signal associated with a simultaneously recorded reference signal, the apparatus comprising:
  (a) a speed controllable device for simultaneously playing back the reference signal and the information signal,
  (b) a time error detector having the reference signal from the playback device applied to its input, the time error detector providing an output signal related to the distortion of the reference signal, (c) a variable delay device having its delay time controlled by only the high frequency component of the output of the time error detector, (d) means for causing the information signal from the playback device to enter the delay device, (e) means responsive to only the low frequency component of the output of the time error detector for controlling the speed of the playback device, and (f) said delay device and said time error detector comprising a closed loop feedback system whereby the high frequency output of said time error detector is continuously fed back to the delay device.

4. High fidelity apparatus for compensating for distortion in a recorded information signal associated with a simultaneously recorded reference signal, the apparatus comprising:

(a) a device for simultaneously playing back the reference signal and the information signal, the playback device being of the type whose speed of playback can be regulated by a control signal, (b) a time error detector having the reference signal from the playback device applied to its input, the time error detector providing an output signal related to the distortion of the reference signal, (c) a variable delay device having the information signal from the playback device applied to its input, (d) means for filtering the output of the time error detector to suppress lower frequencies and applying the filtered output to control the delay time of the variable delay device, (e) means for filtering the output of the time error detector to suppress higher frequencies and applying the filtered output to control the speed of the playback device, and (f) said delay device and said time error detector comprising a closed loop feedback system whereby the high frequency output of said time error detector is continuously fed back to the delay device.

5. Apparatus for compensating for wow and flutter in a recorded information signal, the recorded information signal being associated with a simultaneously recorded reference signal, the apparatus comprising:

(a) a device for simultaneously playing back the information signal and the reference signal, the playback device being of the type whose speed of playback can be regulated by a control signal, (b) a time error detector having the reference signal from the playback device applied to its input, the time error detector providing an output signal relating to the distortion of the reference signal, (c) a variable delay device having the information signal from the playback device applied to its input, (d) means for suppressing the lower frequencies in the output of the time error detector and applying the resultant output to control the delay time of the variable delay device, (e) means connected between the reference signal output of the playback device and the seed control of the playback device for regulating the speed of the playback device to compensate for low frequency distortion of the reference signal, and (f) said delay device and said time error detector comprising a closed loop feedback system whereby the high frequency output of said time error detector is continuously fed back to the delay device.

6. Apparatus for compensating for flutter and wow in a recorded information signal associated with a simultaneously recorded reference signal, the apparatus comprising:

(a) a device for simultaneously playing back the information signal and the reference signal, (b) a variable delay device having the information signal from the playback device coupled to its input, (c) a source of timing signals, (d) a time error detector for comparing the reference signal applied to said time error detector and the timing signals applied to said time error detector to derive an error signal related to the distortion of the reference signal caused by the flutter, (e) means responsive to the error signal for adjusting the delay of the delay device comprising an amplifier and high frequency pass network to minimize the flutter distortion of the information signal, and (f) said delay device and said time error detector comprising a closed loop feedback system whereby the high frequency output of said time error detector is continuously fed back to the delay device.

7. Apparatus for compensating for flutter in a recorded information signal, the recorded information signal being associated with a simultaneously recorded reference signal, the apparatus comprising:

(a) a device for simultaneously playing back the information signal and the reference signal, (b) a first variable delay device having the reference signal coupled to its input, (c) a second variable delay device having the information signal coupled to its input, (d) a reference oscillator, (e) a detector for comparing the output of the first delay means with the output of the reference oscillator and providing an error signal where the compared signals differ in frequency, (f) means responsive to only the high frequency component of the error signal for adjusting the delay in both delay devices to minimize the frequency difference of the compared signals, and (g) said first variable delay device and said detector comprising a closed loop feedback system whereby the high frequency output of said detector is continuously fed back to said first variable delay device.

8. Flutter compensating apparatus as defined in claim 7 wherein the playback device is of the type whose speed of playback is controlled by a servomechanism, the apparatus further comprising:

(a) a low-pass filter having the error signal from the detector applied to its input, and (b) means applying the output of the low-pass filter to the servomechanism to vary the speed of playback.

9. Apparatus for compensating for flutter in a recorded information signal associated with a simultaneously recorded reference signal, the apparatus comprising:

(a) a device for simultaneously playing back the information signal and the reference signal, (b) a first variable delay device having the reference signal from the playback device coupled to its input, (c) a second variable delay device having the information signal from the playback device coupled to its input, (d) a time error detector, the output of the first variable delay device being coupled to the time error detector to cause the detector to provide an output signal related to the flutter of the reference signal, (e) means responsive to only the high frequency component of the output signal of the detector for adjusting the delay of both delay devices to minimize the distortion due to flutter in the signals emerging from the delay devices, and (f) said first variable delay device and said time error detector comprising a closed loop feedback system whereby the high frequency output of said time error detector is continuously fed back to said first variable delay device.

10. Apparatus for compensating for wow and flutter in an information signal which has been recorded concurrently with a reference signal, the apparatus comprising:

(a) a device for simultaneously playing back the recorded information signal and the recorded reference signal,

17

(b) a first variable delay device having the reference signal from the playback device coupled to its input,
(c) a second variable delay device having the information signal from the playback device coupled to its input,
(d) a time error detector having its input signal obtained from the output of the first variable delay device, the time error detector providing an output signal related to the flutter of the reference signal,
(e) means for applying only the high frequency component of the output signal of the time error detector to control the delay of the delay devices to minimize the distortion due to flutter of the signals emerging from the delay devices,
(f) means responsive to the reference signal output of the playback device for regulating the speed of the playback device to compensate for distortion of the reference signal due to wow and the lower flutter frequencies, and
(g) said first variable delay device and said time error detector comprising a closed loop feedback system whereby the high frequency output of said time error detector is continuously fed back to said first variable delay device.

11. Flutter compensating apparatus comprising:
(a) a playback device for providing a reference signal and an information signal, both signals having been simultaneously modulated by flutter,
(b) first and second variable delay lines,
(c) means coupling the reference signal to the input of the first variable delay line,
(d) means coupling the information signal to the input of the second variable delay line,
(e) a reference oscillator,
(f) a detector for comparing the phase of the first delay line's output with the phase of the reference oscillator, the detector providing an error signal indicative of the magnitude and sense of the phase difference of the compared signal,
(g) means responsive to only the high frequency component of the error signal for concurrently adjusting the delay in both delay lines in a direction minimizing the error signal, and
(h) said first variable delay line and said detector comprising a closed loop feedback system whereby the high frequency output of said detector is continuously fed back to said first variable delay line.

18

12. Apparatus for reproducing a recording so as to remove distortion caused by flutter, comprising:
(a) a playback device for concurrently providing a reference signal and an information signal, both signals having been simultaneously distorted by flutter,
(b) a first signal delay line having variable capacitors of the type whose capacitance is controlled by the voltage applied across the capacitors,
(c) means coupling the reference signal to the input of the first delay line,
(d) a reference oscillator,
(e) a detector for comparing the phase of the reference oscillator with the phase of the output of the first delay line, the detector providing an error signal indicative of the phase difference between the compared signals,
(f) means responsive to only the high frequency component of the error signal for controlling the voltage applied across the capacitors of the first delay line to cause the delay time to be changed in the direction reducing the error signal,
(g) a second signal delay line,
(h) means coupling the information signal to the input of the second delay line,
(i) means for causing the second delay line to provide the same delay, and
(j) said first variable delay line and said detector comprising a closed loop feedback system whereby the high frequency output of said detector is continuously fed back to said first variable delay line.

References Cited
UNITED STATES PATENTS

| | | | |
|---|---|---|---|
| Re. 25,809 | 6/1965 | Johnson | 178—6.6 X |
| 2,685,079 | 7/1954 | Hoeppner. | |
| 2,797,263 | 6/1957 | Dolby et al. | 179—100.1 |
| 2,840,800 | 6/1958 | Chester | 178—6.6 X |
| 2,960,568 | 11/1960 | Leyton | 179—100.2 X |
| 2,988,593 | 6/1961 | Olive. | |
| 3,071,644 | 1/1963 | Olive | 179—100.2 X |
| 3,141,926 | 7/1964 | Newell | 178—6.6 X |
| 3,181,133 | 4/1965 | Seitner. | |
| 3,196,360 | 7/1965 | Boyden | 332—52 X |
| 3,306,987 | 2/1967 | Guerth | 179—100.2 |

BERNARD KONICK, *Primary Examiner.*

L. G. KURLAND, *Assistant Examiner.*